March 2, 1965 R. S. CHALLENDER ETAL 3,171,790
PRESSURE VESSEL FOR A NUCLEAR REACTOR
Filed Oct. 10, 1960 5 Sheets-Sheet 1

INVENTORS
RONALD SCOTT CHALLENDER
JACK JONES GRIFFITHS
BY Larson and Taylor

March 2, 1965  R. S. CHALLENDER ETAL  3,171,790
PRESSURE VESSEL FOR A NUCLEAR REACTOR
Filed Oct. 10, 1960  5 Sheets-Sheet 3

INVENTORS
RONALD SCOTT CHALLENDER
JACK JONES GRIFFITHS
BY Larson and Taylor

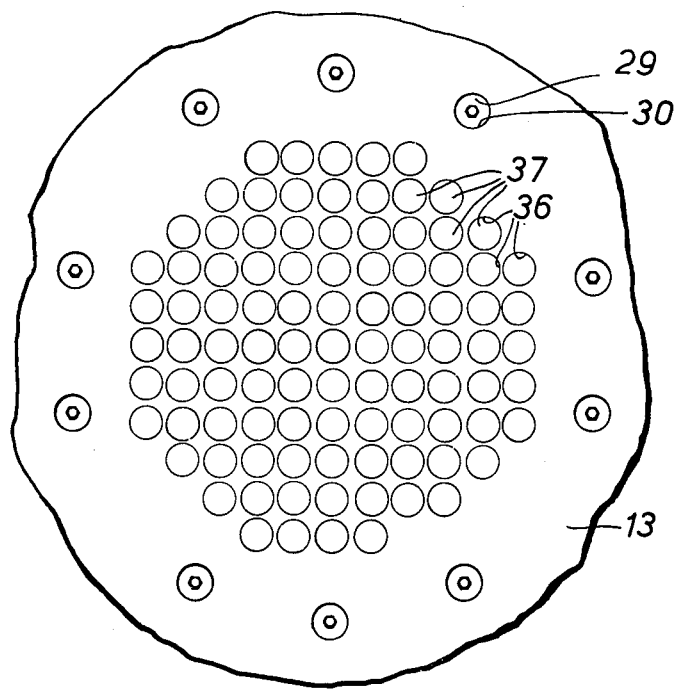

3,171,790
PRESSURE VESSEL FOR A NUCLEAR REACTOR
Ronald Scott Challender, Appleton, and Jack Jones Griffiths, Culcheth, near Warrington, England, assignors to United Kingdom Atomic Energy Authority, London, England
Filed Oct. 10, 1960, Ser. No. 61,445
Claims priority, application Great Britain, Oct. 22, 1959, 35,817/59
4 Claims. (Cl. 176—50)

This invention relates to pressure vessels and it is concerned with the attachment of branch pipes to pressure vessels.

Branch pipes are sleeve-like members which penetrate a pressure vessel to define apertures providing access to the inside of the vessel. The present practice of attaching a parallel array of branch pipes to a pressure vessel has the limitation that the angle (hereinafter referred to as the "branch angle") between the axis of the branch pipe and the tangential plane at the point at which a branch pipe is attached should not be less than about 30° as with an angle less than this the pressure vessel perforation is of an excessively difficult character both to cut and subsequently weld. This limitation is not always convenient. For example, in a spherical pressure vessel, branch pipes can only be attached to provide vertical access to about 75% of the area of the equator.

According to the invention, a pressure vessel penetrated by a branch pipe is characterised in that the axis of the cylindrical surface of contact between the branch pipe and vessel makes a greater branch angle with the tangential plane of the vessel at the point of attachment of the branch pipe to the vessel, than that made by the axis of the bore of the branch pipe with the said tangential plane.

The invention provides, in effect, a branch pipe having a branch angle of, for example, less than 30° but it does not introduce the same difficulty of cutting and welding associated with such an angle. From this fact comes a number of advantages particularly in the nuclear reactor art. In the first place it allows greater utilisation of the space with a nuclear reactor core-containing pressure vessel (particularly a reactor core-containing pressure vessel of spherical, spheroidal or ovoid form) as access is provided more extensively to the equator regions by approach from the polar directions (or vice versa). In the second place it allows penetration of a pressure vessel by a support for a reactor core enveloped by the pressure vessel without the creation of core-weight induced stresses in the pressure vessel and without being too wasteful of the space inside the vessel.

The invention will now be further described, by way of example, with reference to the accompanying drawings wherein:

FIGURE 4 is a plan view of the reactor shown in FIGURE 2.

Figure 1:
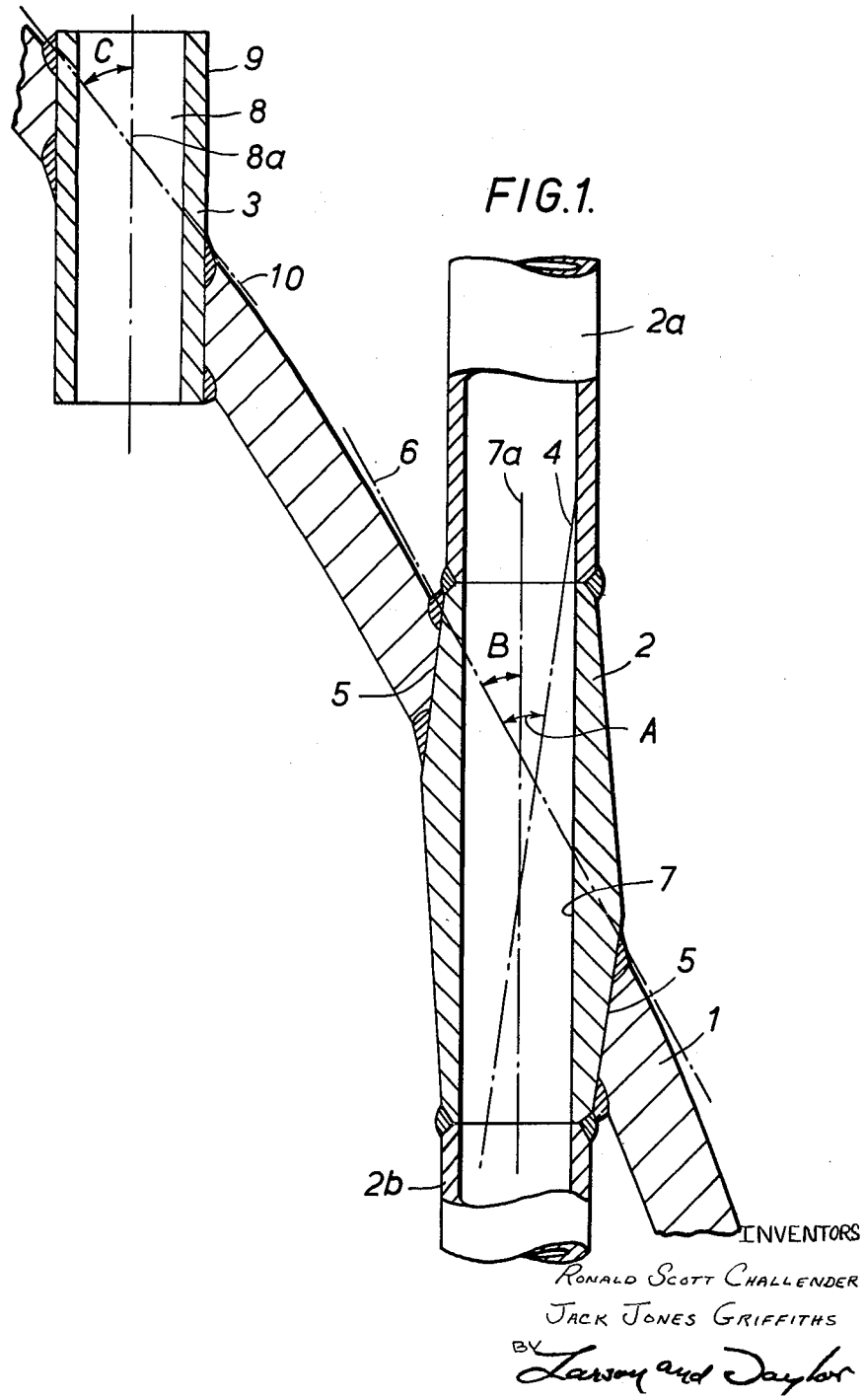
FIGURE 1 is a fragmentary sectional view of a pressure vessel with branch pipes.
Figure 2:
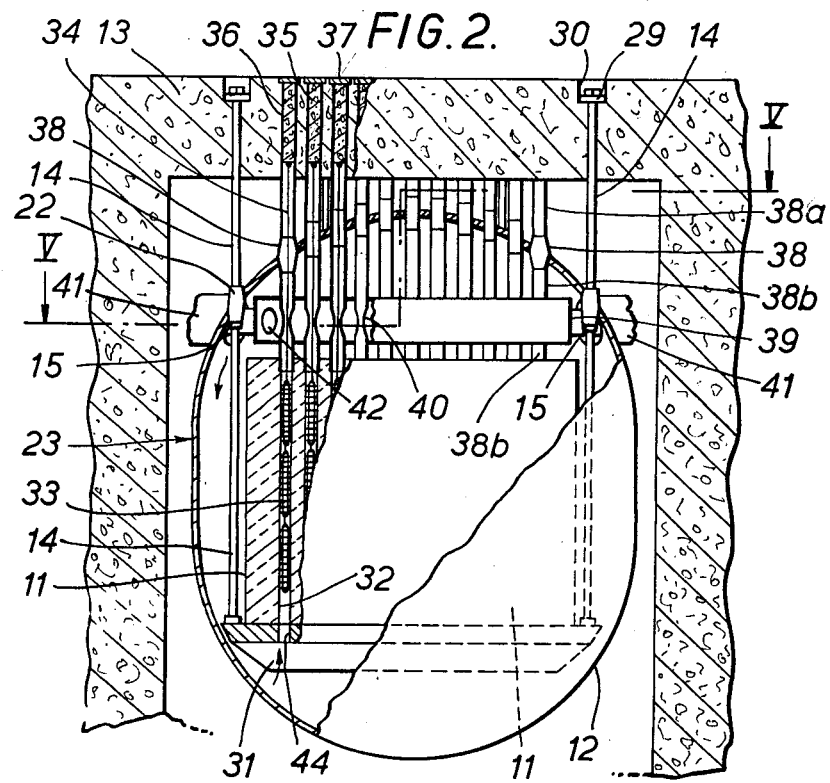
FIGURE 2 is a part-sectional view of a nuclear reactor.
Figure 3:
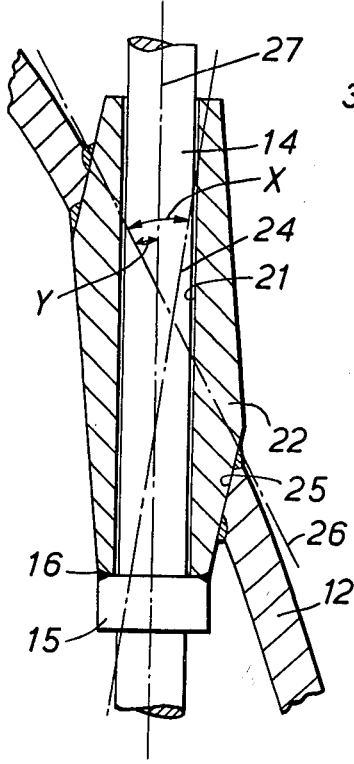
FIGURE 3 is a fragmentary sectional view of a support for a reactor core.
Figure 6:
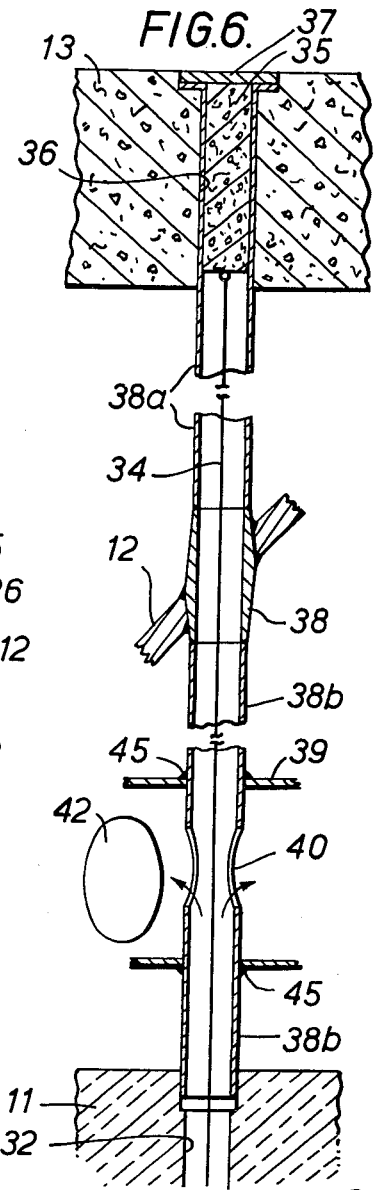
FIGURE 6 is an enlarged detail of FIGURE 2.
Figure 5:
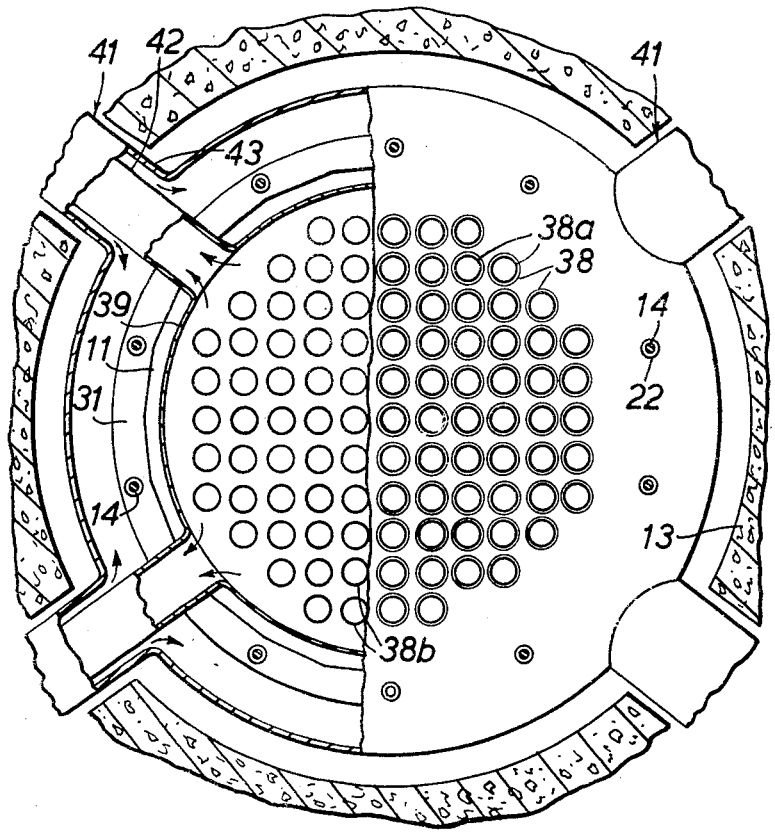
FIGURE 5 is a two-part sectional view taken generally on the lines V—V of FIGURE 2.

In FIGURE 1 a pressure vessel 1 has penetrating branch pipes 2 and 3. Branch pipe 2 is characterised in that the axis 4 of the cylindrical surface 5 of contact between the branch pipe 2 and vessel 1 makes a greater branch angle A with the tangential plane 6 at the point of attachment between branch pipe and vessel than the angle B made by the axis 7a of the bore 7 of the branch with the tangential plane 6. The branch pipe 3 is of conventional type and has a bore 8 concentric with the outer surface 9, such branch pipes being used where the branch angle C between the axis 8a of the bore 8 and the tangential plane 10 is not less than 30°.

Upper and lower extensions 2a, 2b of the branch pipe 2 combine with the pipe 2 to provide access from an external charge face to a reactor core within the pressure vessel 1.

FIGURES 2 to 6 show a nuclear reactor installation 23 wherein a graphite moderator and reflector structure 11 and an enveloping pressure vessel 12 of ovoid form are suspended from the upper face of a biological shield structure 13 by ten tie-rods 14. Branch pipes 22 penetrate the pressure vessel (see particularly FIGURE 3) and the bores 21 thereof define apertures locating the ties 14. The ties 14 each have a collar 15 engaging with the lower ends of the branch pipes 22 to provide support of the vessel 12. Sealing welds 16 are provided between the collars 15 and the branch pipes 22.

The branch pipes 22 each have the same characteristics as the branch pipes 2 of FIGURE 1, that is to say that the axis 24 of the cylindrical surface 25 of contact between the branch pipe 22 and pressure vessel 12 makes a greater branch angle X with the tangential plane 26 at the point of attachment between branch pipe and vessel than the angle Y made by the axis 27 of the bore 21 of the branch pipe 22 with the tangential plane 26.

The upper ends of the tie-rod 14 are attached to anchor plates 29 located in recesses 30 in the shield structure 13. The lower ends of the tie-rods 14 are attached to the periphery of a grid 31 of circular outline. The moderator and reflector structure 11 is carried on the grid 31. The structure 11 is penetrated by a lattice of vertically orientated fuel element coolant channels 32 locating fuel elements 33. The pressure vessel 12 is further penetrated by a lattice of branch pipes 38 having the same characteristics as the branch pipes 22. The bore axes of the branch pipes 38 are aligned with the axes of the channels 32 penetrating the moderator and reflector structure 11 and upper and lower extensions 38a, 38b, combine with the branch pipes 38 (in the manner shown in FIGURE 1) to connect refueling apertures 36 in the shield structure 13 with the channels 32. The fuel elements 33 are end-connected to form strings suspended by cables 34 attached to the lower ends of shield plugs 35 located in the upper ends of the branch pipe extensions 38b. Above the plugs 35 the extensions 38b are closed by removable caps 37. The lower extensions 38b extend through a coolant header 39 to terminate in the upper ends of the channels 32. The extensions 38b are welded to the header 39 by welds 45 to provide support to the header and the parts of the extensions 38b within the header 39 are penetrated by apertures 40 which allow out-flow of coolant from the channel 32 to within the header 39.

Coolant enters and leaves the pressure vessel 12 by way of four radially disposed coolant ducts 41. The ducts 41 are of co-axial type having inner, out-flow ducts 42 and outer, in-flow ducts 43. The ducts 42 are connected to the header 39. The ducts 43 are open to the interior of the pressure vessel 12. Coolant enters the pressure vessel 12 through the ducts 43 to flow downwardly between the moderator and reflector structure 13 and the inner walls of the pressure vessel to pass upwardly through apertures 44 in the grid 31, over the fuel elements 33 in the channels 32 and into the header 39 by way of the apertures 40 in the branch pipe extensions 38b. From the header 39 the collant flows out of the pressure vessel 12 by way of the ducts 42. Heat is then removed from the coolant by heat exchangers connected to the co-axial coolant ducts 41.

We claim:
1. A nuclear reactor comprising a pressure vessel, means defining a first series of apertures penetrating the upper end of the pressure vessel, said first series of apertures each having an axis inclined to the tangential plane of the outer wall of the pressure vessel at the point of penetration, a first series of branch pipes disposed longitudinally in said first series of apertures, each branch pipe of said first series of branch pipes having a bore axis also inclined to said tangential plane but defining a lesser angle therewith than that of an axis of each of said first series of apertures, a support structure above the pressure vessel, a moderator support within the pressure vessel, tie-rods extending through the bores of said first series of branch pipes to connect the support structure with the moderator support, a moderator structure having fuel channels therein and carried by the moderator support, pressure vessel support means carried by said tie-rods, a second series of apertures penetrating the pressure vessel, said second series of apertures each having an axis inclined to a second tangential plane of the outer wall of the pressure vessel at the point of penetration, a second series of branch pipes disposed longitudinally in said second series of apertures, each branch pipe of said second series of branch pipes having a bore axis aligned with the axis of a fuel channel and also inclined to said second tangential plane but defining a lesser angle therewith than that of an axis of each of said second series of apertures.

2. A nuclear reactor comprising a pressure vessel, means defining a plurality of apertures penetrating the pressure vessel, said apertures each having an axis inclined to the tangential plane of the outer wall of the pressure vessel at the point of penetration, branch pipes disposed longitudinally in said apertures, each of said branch pipes having a bore axis also inclined to said tangential plane but defining a lesser angle therewith than that of an axis of each of said apertures, a moderator support disposed within the pressure vessel, a support structure above the pressure vessel, tie rods extending through the bores of said branch pipes to connect the support structure with the moderator support, pressure vessel support means carried by the tie-rods, a moderator structure having coolant channels extending therethrough mounted on the moderator support, a coolant inlet duct and a coolant outlet duct penetrating the walls of the pressure vessel, nuclear fuel in the channels and means defining flow paths for coolant between one end of said coolant channels and said coolant inlet duct and between the other end of said coolant channels and said coolant outlet duct.

3. A nuclear reactor as claimed in claim 1 wherein said pressure vessel support means comprise collars attached to the tie-rods and engaging with the lower ends of said first series of branch pipes.

4. A pressure vessel, means defining an aperture penetrating the pressure vessel, said aperture having an axis inclined to the tangential plane of the outer wall of the pressure vessel at the point of penetration and a branch pipe disposed longitudinally in said aperture, said branch pipe having a bore axis also inclined to said tangential plane but defining a lesser angle therewith than that of said axis of said aperture, the outer walls of said branch pipe at the intersection with the walls of said aperture being substantially parallel to the corresponding walls of said aperture so as to matingly engage therewith, and said branch pipe being welded to the vessel at the intersections with said walls of said aperture.

References Cited in the file of this patent
UNITED STATES PATENTS

| | | |
|---|---|---|
| 2,103,677 | Kline et al. | Dec. 28, 1937 |
| 2,848,404 | Treshow | Aug. 19, 1958 |
| 2,863,815 | Moore et al. | Dec. 9, 1958 |
| 3,000,728 | Long et al. | Sept. 19, 1961 |
| 3,073,771 | Moulin | Jan. 15, 1963 |